(12) United States Patent
Wainwright

(10) Patent No.: US 6,902,305 B2
(45) Date of Patent: Jun. 7, 2005

(54) VEHICLE MARKING METHOD, DEVICE, VEHICLE AND ADAPTED ROAD

(75) Inventor: Neil Arthur Wainwright, Velserbroek (NL)

(73) Assignee: Wainlight, Velserbroek (NL)

( * ) Notice: Subject to any disclaimer, the term of this patent is extended or adjusted under 35 U.S.C. 154(b) by 0 days.

(21) Appl. No.: 10/386,479

(22) Filed: Mar. 13, 2003

(65) Prior Publication Data

US 2003/0174505 A1 Sep. 18, 2003

(30) Foreign Application Priority Data

Mar. 14, 2002 (EP) .............................. 02076235

(51) Int. Cl.$^7$ ............................... B60Q 1/00
(52) U.S. Cl. ................ 362/485; 362/505; 362/510; 362/540
(58) Field of Search ................... 362/485, 510, 362/511, 505, 540–542, 546, 559, 495; 40/547, 556, 560; 340/468, 470, 475, 479

(56) References Cited

U.S. PATENT DOCUMENTS

| | | | |
|---|---|---|---|
| 1,802,958 A | | 4/1931 | Ravencroft |
| 2,023,845 A | * | 12/1935 | Larose .................... 40/556 |
| 3,017,500 A | | 1/1962 | Pezzopane |
| 4,811,171 A | * | 3/1989 | Viola ..................... 362/485 |
| 5,209,559 A | | 5/1993 | Ruppel |
| 5,430,625 A | | 7/1995 | Abarr et al. |
| 6,392,559 B1 | * | 5/2002 | Sharpe, Jr. ........... 340/825.72 |
| 6,543,917 B1 | * | 4/2003 | Berlinghof .............. 362/485 |
| 6,685,347 B2 | * | 2/2004 | Grutze .................... 362/487 |

* cited by examiner

Primary Examiner—Sandra O'Shea
Assistant Examiner—Mark Tsidulko
(74) Attorney, Agent, or Firm—Young & Thompson

(57) ABSTRACT

A method of locating the position of a vehicle (5) for the driver thereof, characterized in that use is made of the surface area around the vehicle by projecting a light beam (10) from the vehicle or vehicle part to be located substantially downwards on to the surface, such that at uninhibited projection thereof, a lighted spot (6) is created on the surface, at least substantially outside the circumference of the relevant vehicle part as seen in plan view. The invention specifically supports safe overtaking manoeuvres of large vehicles like trucks. The invention further includes a device, a vehicle and an adapted road for performing the method, and based thereupon.

16 Claims, 5 Drawing Sheets

VEHICLE MARKING METHOD, DEVICE, VEHICLE AND ADAPTED ROAD

BACKGROUND OF THE INVENTION

The present invention relates to a vehicle marking method, device, a vehicle and an adapted road as based on the principle of the method.

Vehicle markers are known in the form of e.g. reflectors or lights for indicating the position and/or location of a vehicle to other participants in traffic. For the driver of the vehicle itself, indication of the location of a vehicle part is however, only rarely applied. Cost and complexity of such known devices are of influence on this circumstance, such as radar, laser or camera based parking support devices. Most commonly, the driver of a vehicle is to rely on experience or estimated guess at determining the location of e.g. the rear part of his vehicle.

Especially at truck lorries or other relatively large vehicles, it is even for considerably experienced drivers thereof, complicated to estimate the location of the rear end of their vehicle. Side mirrors specifically directed to the rear end of the vehicle are helpful, but also put a strain on the driver because of a mentally required task to translate a very often reduced picture size into reality sizes. There may also be a requirement to simultaneously watch, i.e. switch towards a second mirror directed to rear traffic, i.e. to the traffic lane aside from the traffic lane the vehicle is in. For this reason one may notice a widely spread practice of truck drivers supporting one another at completing an overtake action by signalling their head lights. The overtaking vehicle, i.e. the passing vehicle may than safely switch to the lane of the passed vehicle. Though helpful at safely completing overtake actions, the gentlemen-like practice of signalling lights is not fully adequate. It only occurs at overtake actions and even then, it is only practiced by truck drivers for other truck drivers. Also, the signalling is often performed only once, so that when the attention of the driver is required at the traffic ahead, he may miss the signal, and still not know for sure whether he has passed the other vehicle.

In U.S. Pat. No. 5,430,625 the problem of safely changing lanes is mentioned. The document suggests to solve this problem by an "illuminating system for lighting the area immediately adjacent the rear wheel" of the vehicle or semi-trailer", since "a driver needs to be able to see any objects which are adjacent the side of the trailer". It is further argued that "particularly at night it is impossible to view the area around the rear wheel", while it is noticed that the position of the rear wheels is important "since the length of the turning radius is dependent upon the position of the rear trailer wheel". As a solution "the area of the immediately adjacent the rear wheel" is provided with an illumination system. However, with a system according to this prior art, it may during daylight still happen that the driver is unable or insufficiently able to estimate the rear side of the vehicle. Also, it may happen that the driver, especially when different trailers are being used, and at high travelling speeds, insufficiently realises what length of vehicle still passes by behind the rear wheels.

SUMMARY OF THE INVENTION

For all these above reasons of costs, complexity, reliability and/or dependence of known methods, it is the object of the invention to provide a simple to implement, reliable, easily, permanently and independently usable manner and device of locating the rear end of a vehicle in an ultimately safe and reliable manner, be it by night or by day.

With such a method it is possible to locate a desired part of a vehicle permanently or alternatively at any time desired, without being dependable on other traffic participants or hampering these. If the form of the spot is visible on the road in a predefined state, in particular as a projected image, this tells the driver that there is no object in the near vicinity of the relevant vehicle part. Alternatively, e.g. at overtaking, the spot would not have been visible at least not fully, due to the presence of the overtaken vehicle. The locating method uses the principle that if the light beam is uninterrupted, i.e. creates a light spot on the surface surrounding the vehicle, it forms a sign that no object, vehicle or other kind of traffic participant is within the near vicinity of the vehicle. Thus, this method realises a relatively cheap and reliable manner of locating a vehicle part. Moreover, in the same manner it also forms a parking support.

Since the beam of light is according to the invented method, projected at least substantially downwards, it does not blind or hamper other traffic participants. Yet in a preferred embodiment the method uses a light shield in the near vicinity of the light source so as to secure that no other vehicle participant will be blinded, at least not easily. The method according to the invention may be applied permanently, i.e. while using the vehicle or, alternatively at any time convenient, i.e. switched on by the driver, e.g. at parking or overtake actions. It may also in accordance with the invention be applied as a function of e.g. the rearward driving of the vehicle, e.g. by tapping a signal from the rearward driving lights of the vehicle, or e.g. as a function of the direction signalling lamps. Without diminishing the basic principle of the invention, the method may even be incorporated as a function of the vehicle braking, thereby increasing safety on the road.

In a favourable elaboration of the invented method, the spot of light created on the ground corresponds to the desired amount of distance to be kept from either other traffic users or objects such as a parking bay. Thus, a favourable application of the method relates to locating a spot of light to a rear quarter of a vehicle, i.e. having the spot both outside from the lateral circumference of the vehicle, and from the rear end of the vehicle. Thus, at overtaking a traffic participant, the free and complete presence of the spot not only tells the driver that the rear end of the vehicle is passed the other vehicle or person, but also that switching back is performed with a minimum of longitudinal distance, while e.g. at parking in a dock station, the increasing part of the spot on to the wall of the dock visually informs the driver about the remaining distance to the dock. Thus, it will be understood that the current invention not only relates to a method of locating the position of a vehicle or part thereof, but also to a light source adapted and or used in accordance with a further part of the same invention in a manner suited for performing the new method, and to a vehicle in which such method is applied or in which is fitted a light source according to the invention. In this respect it is noticed that in principle the method and light source may be used at any circumferential part of the vehicle, even at the front end or nose thereof. Though the spot is preferably formed as an at least largely circular shape, it may as well be provided with any other shape, even as a circumferential strip of light surrounding the vehicle, which may aid the driver at taking bends or turns safely in relation to sideways present objects such as buildings and cyclists.

In a further elaboration of the same invention the method is optimised by providing the road surface with means for optimised reflection of the light beam, in particular for reflecting a predefined part of the spectrum of wavelengths. In this respect, according to the invention, the road surface may e.g. be formed with or finished with grains featuring such reflection quality and e.g. mixed with the superficial asphalt layer or separately applied thereon afterwards. In this manner, the intensity of the light beam may be kept modest, thus visually virtually unnoticed, while the spot of light on the ground may still be clearly noticeable. It will be clear that the invention therefore also relates to a road or road surface adapted in any manner to enhance the functioning of the current method, in particular in the above said manner.

In yet a further elaboration of the invention, the wavelength of the emitted light is preferably but not necessarily as when in blue or violet, in the invisible spectrum, e.g. infra red or ultra violet, while the method is applied in combination with materials changing the wavelength of the light to another, visible colour such as green yellow or red. In this respect according to the invention these materials may be applied either to the road surface or to a mirror used in combination with the method, for keeping track of the shape and location of the intended light spot. The materials me also be applied to the lense, which in an elaborated version of the invention is arranged interchangeable, e.g. to accommodate lenses with different colours.

BRIEF DESCRIPTION OF THE DRAWINGS

The invention will now by way of example be elucidated further, along a drawing in which.

In the figures, identical reference numbers relate to identical or at least comparable technical features.

DESCRIPTION OF THE PREFERRED EMBODIMENTS

Figure 1:
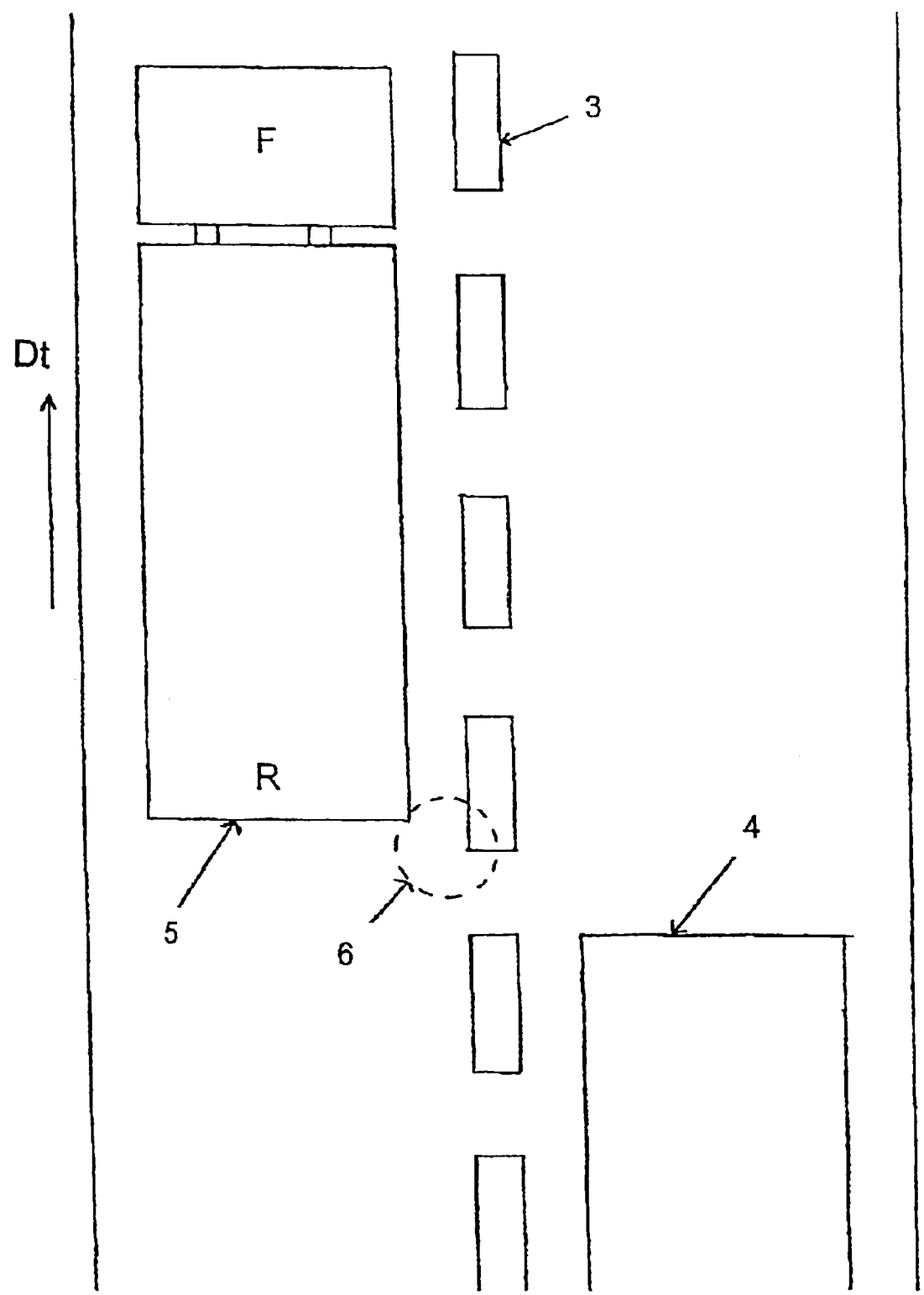
FIG. 1 schematically shows a plan view of an overtaking traffic situation, and provides an example of the method according to the invention.

FIG. 1, in a top view, shows a road part with two lanes 1, 2, separated by an intermitted line 3. In the right lane 1 as seen in the direction of travel Dt, a first vehicle 4 is being overtaken by a second vehicle 5, crossing the lane division line 3 for re-switching from lane 2 to lane 1. Laterally to the side of vehicle 5, and to the rear R of the vehicle 5, a spot 6 of a lighted road surface part is created by a light source not visible in the present view. The front or head side of the vehicle is denoted F. In case the vehicle 5 is a truck, while the light source is located below the back of the truck. It is directed predominantly downwards, however, also sideways and, in this embodiment, rearwards, so as to create the spot in the rightmost rear quarter of the back of the truck. When switched on, as may e.g. be implemented in dependence of the functioning of the engine, the spot is visible on the road surface as long as it is not interrupted partly or wholly by the truck keeping insufficient distance sideways, and in this example also longitudinally from the vehicle 4 which is being overtaken, i.e. which is being passed.

Figure 2:
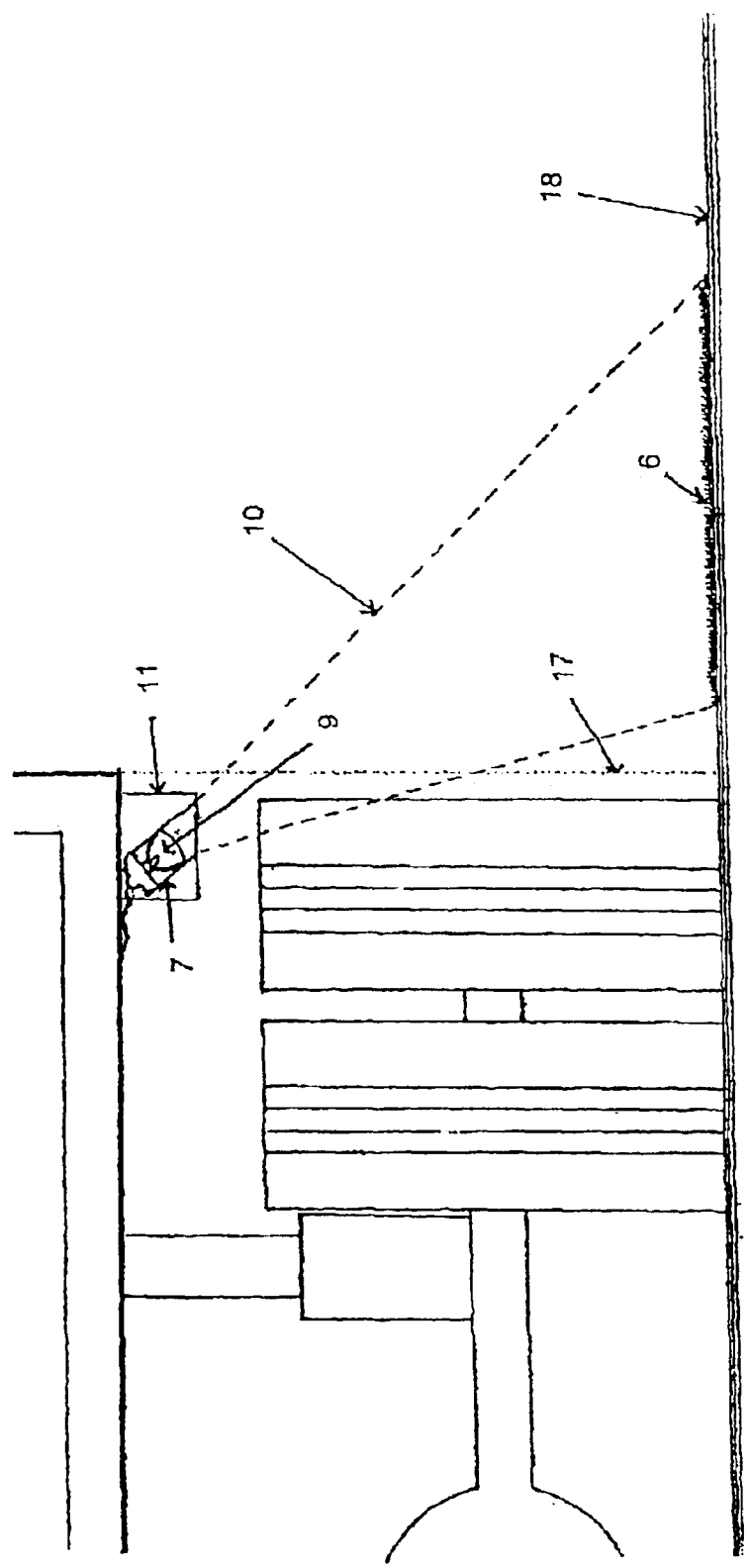
FIG. 2 shows a rear part of a vehicle and is a schematic example of a vehicle provided with a device according to the invention.

FIG. 2 in an elevation from the back of a truck, showing the rear part thereof, shows a device 7 for emitting light in accordance with the invention, mounted within the circumference of the truck, below and against the back of it, at or at least near the rearmost end thereof. Thus, in principle behind the rear wheels of the vehicle. It encompasses a light shield 8, here formed by the housing and embodied as a tube part, which prevents other traffic users from glazing into the light source. The light source 9 in a preferred embodiment incorporates a normal automotive bulb. It may however also be produced alternatively, e.g. as a laser or UV or infrared lamp. The present device 7 incorporates a lens via which it is directed in a conically shaped beam 10 of light, which causes a lighted spot or image 6 on the road surface. At most, the outer side of the conus or beam is oriented under an angle of 45 degrees with an imaginary vertical line through the light source. Preferably, and also according to the invention, the lighted spot part closest to the vehicle remains outside the vehicle circumference 17 as projected on the road 18. The picture further shows a protective shield 11, protecting the device from distortions as may occur in rough operating environments as at trucks, thereby securing the spatial orientation of the device. In a preferred embodiment a vehicle according to the inventions is provided with at least two marking devices, more preferably with each being located to mark the left and right rear quarter of the vehicle.

Figure 3:
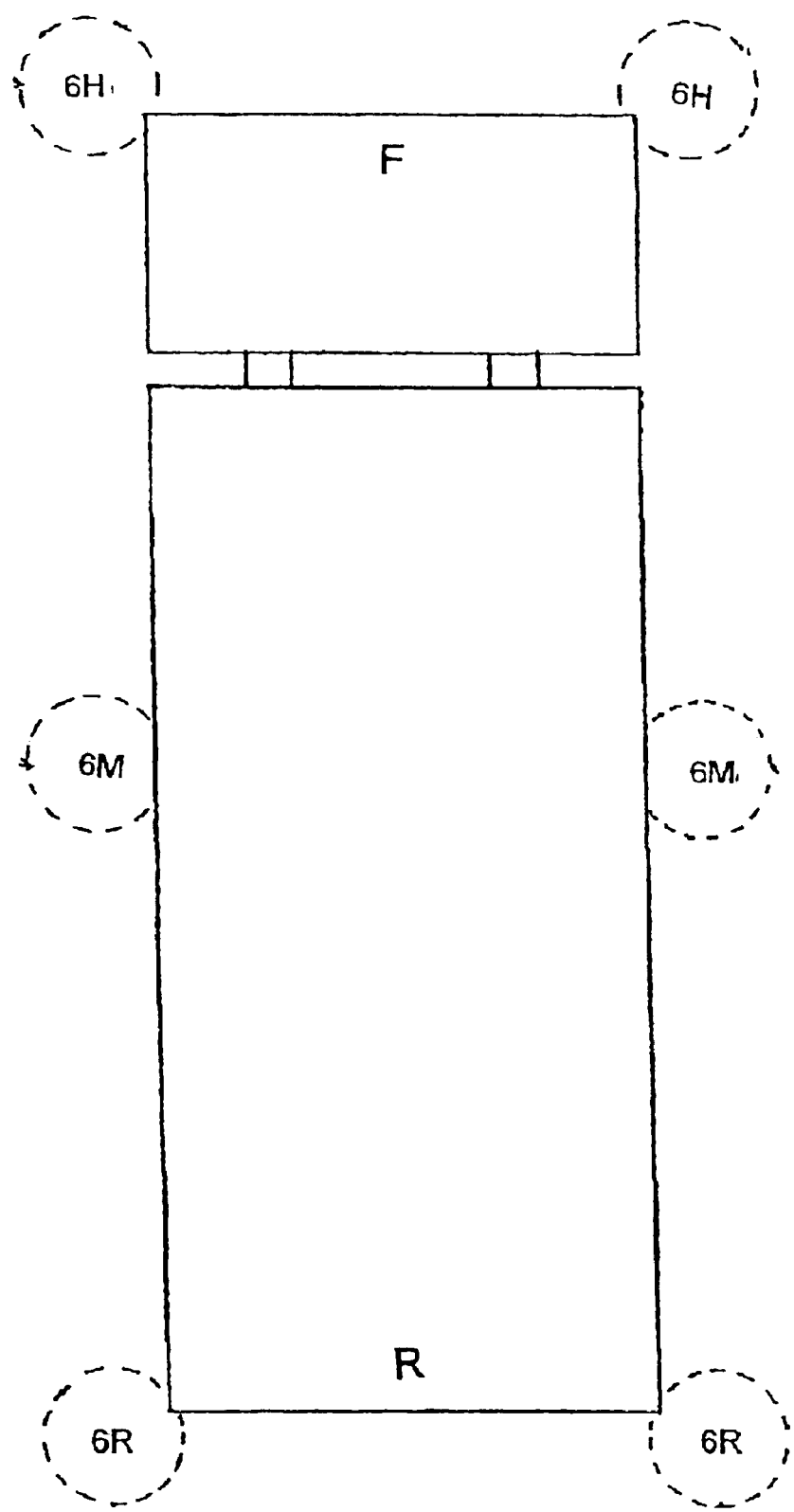
FIG. 3 is schematic example of another manner of applying the method according to the invention, here using six marking devices.

FIG. 3, in a plan view of a vehicle, illustrates that the device according to the invention, may, in the method according to the invention, be located any where on the vehicle. In the figure, the dotted lines show the position of the prospected image on the road surface. In this example a device is favourably located at each corner of the vehicle and, lengthwise, in the middle of the vehicle, creating spots 6H, 6M and 6R. The head end spots 6H may support both other traffic users and the vehicle driver. Preferably, in accordance with the invention, the vehicle is provided with a mirror or a set of mirrors directed to the location of these spots 6H. In a further elaboration of this set-up, the front, middle and rear devices have different colours, e.g. white, amber and red for spots 6H, 6M and 6R respectively. In a most preferred embodiment, rear spots are visible on the surface in a red colour. Thus, these lights may be used to support a braking signal, increasing safety on the road. Such support may either be arranged by intensifying the light of a permanently present marking spot, or by automatically switching on these lights at breaking, when the lights are further only used during an overtake action or during another temporary use such as at turns.

Figure 4:
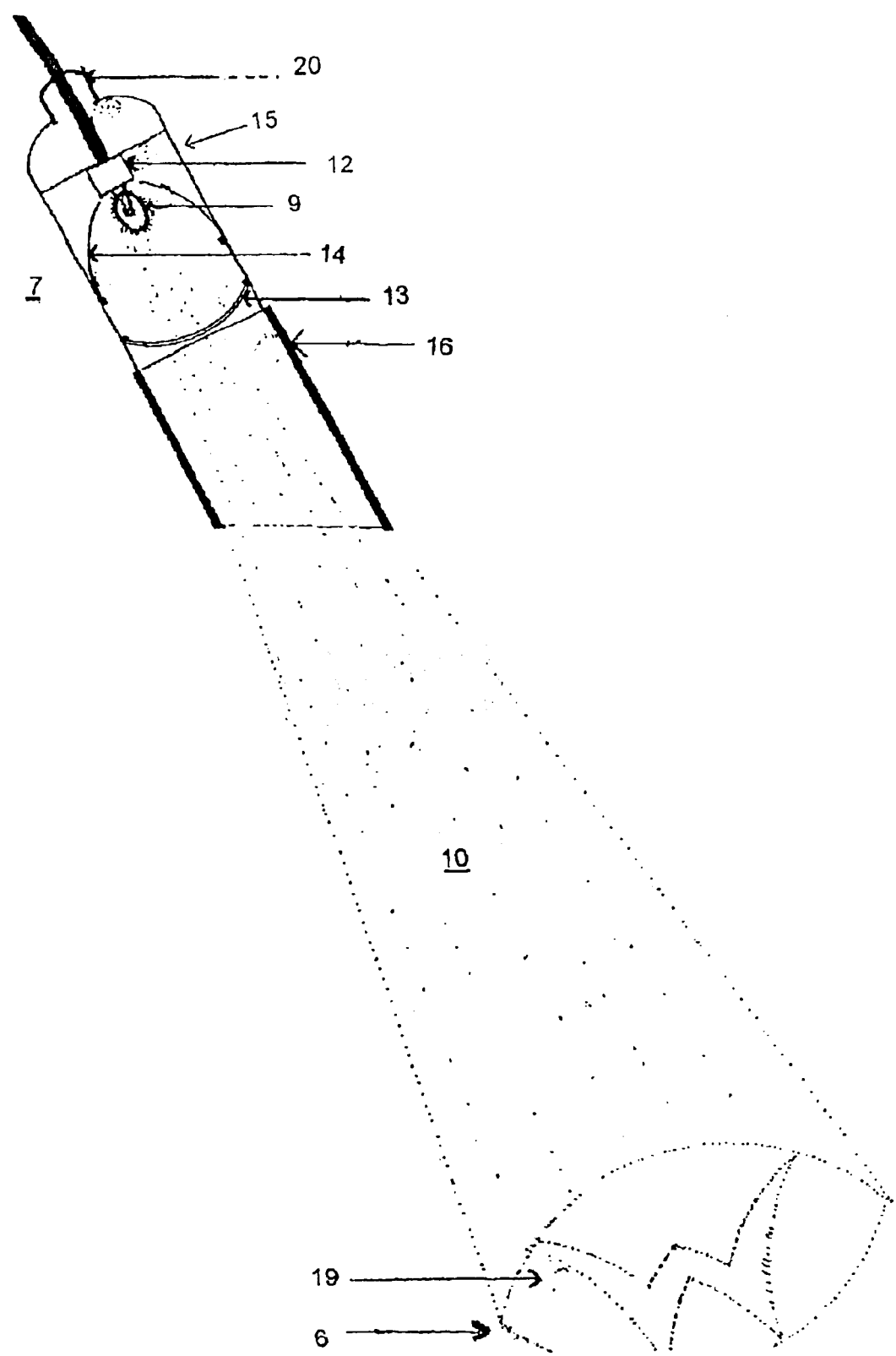
FIG. 4 is a sectional view of one example of a light source according to the invention, suited for use in the method according to the invention.

FIG. 4 in a cross sectional view of the device 7, shows a version is fitted with a lens 13, which may be re-directed for correctly directing the light beam emitted by a light source 9, here inserted to a fitting 12 on a waterproof seal 20, with an electric current source connected to the electrical system of the vehicle. Preferably a reflector element 14 is used for redirecting light towards the open side of the device, from which the beam 10 of light exits the device. The fitting part 12, the light source 9 and the reflector 14 are incorporated in a preferably tube like housing 15, through which no light escapes. A further, also light untransparant tube part 16 is fitted preferably telescopically shiftable in extension to said first housing part. It further shields other users from possibly visually becoming disturbed by the light source. When as in the current version it is mounted such, to be fixatable in various telescopically shifted positions, the size of the lighted spot 6 on the road surface may be adapted. This also enables the device to be correctly fitted at various locations under the back, and at various levels of height. Preferably the device is mounted as close as possible to the relevant corner of the vehicle. The end of tube part 16 is generally cut obliquely relative to the axial orientation of the tube, such that the lower side of the device may extend substantially horizontal. FIG. 4 further elucidates that various images 19 may be projected in the lighted spot, either by a colouring part of the lens differently or by simply blanking out a part of the lens in the desired form, e.g. in the form of the letter "W" as in the current example. Thus the device according to the invention also has an application in advertising or promotion of marks such as trade marks. It is noted that different from the example provided by the drawings, the device may also be mounted against the side wall of the truck, i.e. either partly within the general circumference of the truck, e.g. in an opening or, to a limited extend partly or wholly projecting there from.

The reason for choosing this type of device is because drivers of large vehicles without trailer cameras, cannot see when their vehicle is safely past another vehicle. Other drivers of large vehicles respect that it is not possible to see where the rear of his trailer is, and so they signal with their head lights. It is not sure whether this gentlemen's practice may withstand the pressure of todays and future traffic pressure. Further, most car drivers do not know that truck drivers cannot safely tell where the rear of their trailer is on the road, and so they do not signal to the truck driver that it is safe for him to pull in. Thus, the truck driver pulls in when he thinks it is safe. Very often it is not safe. This causes the car driver to brake sharply. Then the car behind him brakes harder and so on until there is an accident. The use of a lighted spot on the road surface in association with a predefined part, or predefined parts of a vehicle, in particular a truck, is a good way of solving this problem. The method and light projecting device is simple, cheap and very effective. It also fulfils a long felt need solves a long felt need at truck drivers and other traffic users.

The device is marketed under the name of WAIN-LIGHT™. Wain is old English for wagon. Pseudonyms are motorway light, overtaking light and passing light. The WAINLIGHT has been devised primarily as a safety light for large vehicles as well as for use as side marking with a colour code for use as freight identification, identification of dangerous goods etc. The concept of the WAINLIGHT may quite simply also be represented as, a spot or shape of light, that can be seen by drivers, projected from e.g. the underside of a vehicle onto the road surface, at an angle of no less than 45 degrees from the horizontal, situated at, or at least closely to the most extreme point at the rear of the vehicle, facing towards the side of the vehicle and pointing not more than 45 degrees to the rear, preferably no more than 5 degrees towards the rear of the vehicle. The spot marks the rear quarter of the vehicle, the degrees shown are maximum limits and can be, in a current version, manually be adjusted to a position suited for the relevant trailer or vehicle. The spot or shape of light, projected onto the surface of we road by the WAINLIGHT, gives the driver the ability to accurately tell what position his vehicle is in on the road, specifically for overtaking, but also for reversing to a loading bay. Specifically for such purpose, in accordance with the invention, a cross shape may be projected as well. The WAINLIGHT spot can have many forms. A spot of light projected onto the road surface is what must be produced according to the invention, and for this all spot forms preferably have a prevailing common shape such as a circle, or alternatively, a circular shape.

A length of tube or pipe, the length and diameter of which is relative to the size of the fitting and the wattage of the bulb, and possibly to the level of mounting of the marker device is common to all marker devices. It is according to the invention preferred if not required to be present, so as to prevent other road users from being blinded by the bulb, or alternatively by the initial, often intense part of the emitted light beam. The outer most end of the pipe or tube is formed at least approximately horizontal to the road surface, so that the bulb cannot be seen by another driver at any time. The wain light when fitted at the rear quarter of a vehicle, preferably would have an angle to the road surface of between 80 and 70, preferably 75 degrees from the horizontal and so, the angle of the end of the wain light would in the preferred position be approximately 15 degrees to the road surface. According to a further elaboration of the invention the wain light spot is coloured to avoid confusion. It may possibly also be linked to the braking circuit of the vehicle, thereby doubling the safety in traffic.

Figure 5:
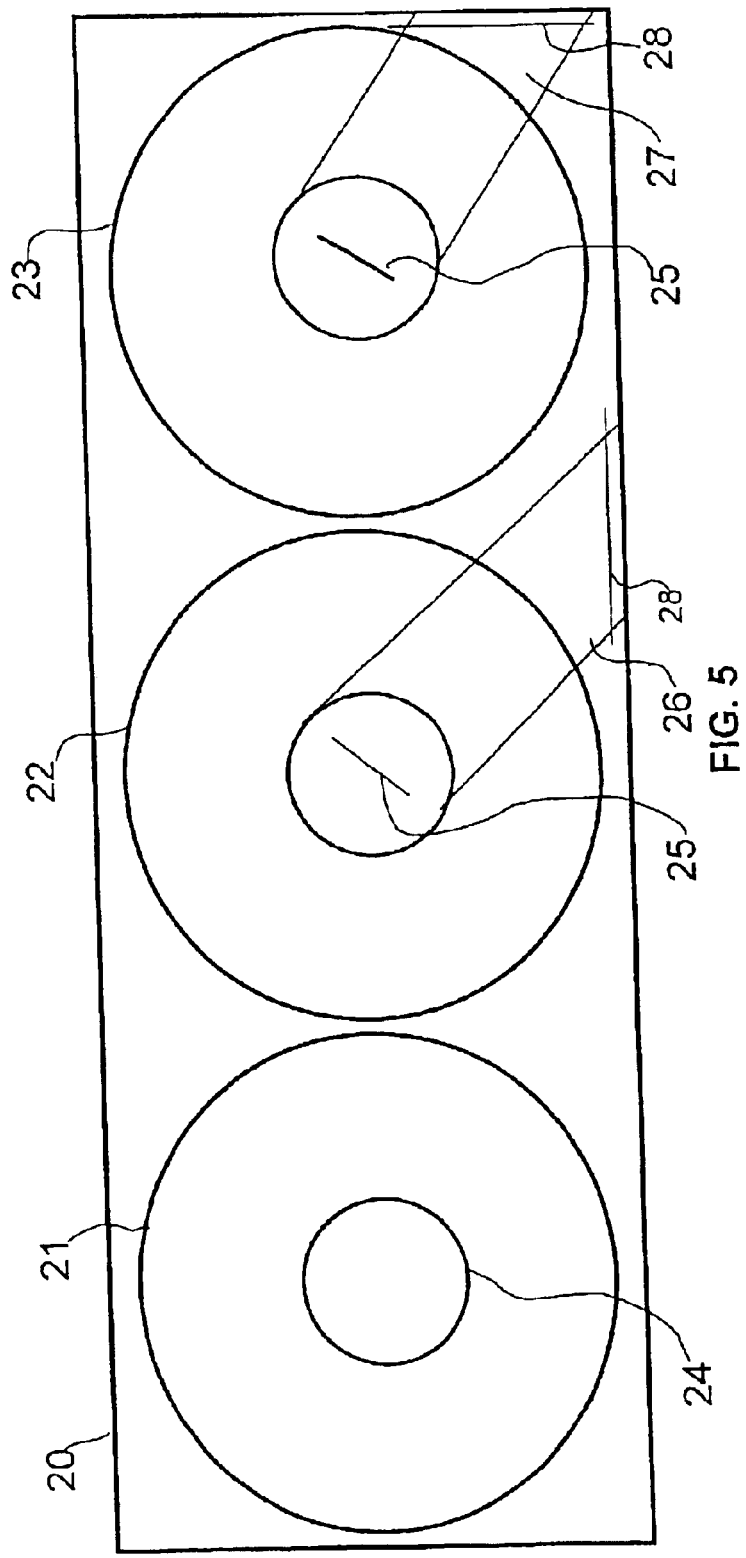
FIG. 5 is a rear view of a light unit according to a specific embodiment.

FIG. 5 schematically shows the rear view of a typical nowadays rear truck light unit, however favourably modified according to the invention to accommodate the means for projecting an image on the road as according to the above. The light unit 20 commonly comes with a three-dimensional, commonly produced in a red transparent synthetic glass or plastic. In the unit 20 a plurality, here three, of separate lights 21–23 including a reflector and a bulb 24 is provided. In some of the bulbs 24 the light emitting thread 25 alternatively denoted filament thereof is indicated. According to the invention now, such light unit 20 is provided with a tube 26 or 27 projecting downwards and to the side of the vehicle as earlier described. In the tube is incorporated a lens 28 for concentrating and reinforcing the light beam to be projected and also carrying the dia-positive for creating the desired image and/or main colour to be projected on the road. These dia-positives may easily be changed for creating different images on the road. This may e.g. be a mainly red or yellow coloured spot having the word "grain" in it for indicating a load carried by the lorry, but it can as well be a commercial sign. When the tube, as tube 27 is included with the lamp to be mounted to the side of the truck it may either end to the side of the lamp or to the bottom thereof as is the case with tube 27. In the latter case the tube is not only directed laterally but, at least in the embodiment as according to indicated possibility of tube 27, slightly to the rear. The latter configuration in the case of three lamps has the advantage that it may at many units be fitted at either side of truck. According to the invention a tube 26 or 27 partly surrounds a bulb 24 so as to retrieve a fair amount of light without hampering the ordinary signalling function thereof. Also the unit is preferably arranged such that when a bulb is fitted, it may be or otherwise is positioned to the effect that the glow filament 25 is oriented at least substantially transverse to the direction of the tube as taken in rear view.

It is further remarked that the invention, apart from the following claims, also relates to the preceding description and all details and aspects in the drawing which are directly and unambiguously derivable there from, at least by a man skilled in the art.

What is claimed is:

1. A method of locating a position of a wheeled vehicle by an operator thereof for the purpose of over overtaking other traffic participants in which use is made of a road surface area around the vehicle, the method comprising the steps of:

projecting a light beam from a light source on a vehicle part to be located, substantially downwards on to a road surface, such that at uninhibited projection thereof, a lighted spot is created on the road surface by the use of at least one focusing lens, at least substantially outside and to a rear and side of a plan view circumference of the vehicle;

evaluating by an operator of the vehicle whether there is sufficient room to overtake other traffic participants by comparing a position of the lighted spot on the road surface relative to positions of the other traffic participants; and emitting the light beam permanently during moving operation of the vehicle.

2. The method according to claim 1, wherein the lighted spot is projected fully outside and in an immediate vicinity of the plan view circumference of the vehicle.

3. The method according to claim 2, wherein the lighted spot stretches away from the plan view circumference of the vehicle over a distance corresponding to a desired distance to other traffic participants.

4. The method according to claim 1, further comprising the step of shielding the light source with a downwardly extending shield located near the light source so as to prevent other traffic participants from becoming blinded by the light beam.

5. The method according to claim 1, further comprising the step of projecting one of an informational and advertising image in the lighted spot.

6. The method according to claim 1, further comprising the step of varying a size of the lighted spot with a speed of the vehicle.

7. The method according to claim 1, wherein the light source is attached to the vehicle part to be located.

8. The method according to claim 1, wherein the light source is located on the vehicle at a level below one meter above the road surface.

9. The method according to claim 1, wherein the light source is one of a turn signal, a brake light, and a back-up light for the vehicle, and wherein the method includes the step of directing light from a bulb of the light source through a tube.

10. The method according to claim 1, wherein the lighted spot includes a color other than white.

11. The method according to claim 1, further comprising the step of adding to the road surface particles that reflect a predefined spectrum of wavelengths emitted by the light source.

12. A light unit for being mounted on a vehicle, comprising:

a signal lamp that is one of a back-up light, a turn signal, and a brake light for the vehicle;

a tube having one end near a bulb of the signal lamp and another end at an outlet from the light unit; and said tube having a lens for creating a lighted spot on a road surface beside and to a rear of a vehicle on which the light unit is to be mounted, wherein a size of the lighted spot varies with a speed of the vehicle.

13. The light unit according to claim 12, wherein the lighted spot includes one of an informational and an advertising image.

14. The light unit according to claim 12, wherein the lighted spot is non-circular.

15. A vehicle comprising the light unit of claim 12.

16. The vehicle according to claim 15, wherein the light unit is mounted on a bottom side of a rearward extending part of the vehicle.

* * * * *